US008573495B1

United States Patent

(12) Liu et al.

(10) Patent No.: US 8,573,495 B1

(45) Date of Patent: Nov. 5, 2013

(54) RADIO FREQUENCY IDENTIFICATION ELECTRONIC DEVICE WITH ENHANCING SURFACE WAVE-GUIDE EFFECT

(75) Inventors: Tai-Hwa Liu, Hsinchu (TW); Yi-Chun Sung, Hsinchu (TW); Cheng-Lun Yin, Hsinchu (TW); Li-Chi Chang, Hsinchu (TW)

(73) Assignees: Tai-Hwa Liu, Hsinchu (TW); Yi-Chun Sung, Hsinchu (TW)

( * ) Notice: Subject to any disclaimer, the term of this patent is extended or adjusted under 35 U.S.C. 154(b) by 0 days.

(21) Appl. No.: 13/561,252

(22) Filed: Jul. 30, 2012

(51) Int. Cl.
*G06K 7/08* (2006.01)
*G06K 19/06* (2006.01)

(52) U.S. Cl.
USPC ............................ 235/451; 235/439; 235/492

(58) Field of Classification Search
USPC ............... 235/439, 451, 472.01–472.03, 492, 235/375, 380; 340/10.1, 10.2, 12.51, 572.1, 340/572.2, 572.7
See application file for complete search history.

(56) References Cited

U.S. PATENT DOCUMENTS

| | | | | |
|---|---|---|---|---|
| 6,517,000 | B1 * | 2/2003 | McAllister et al. | 235/462.01 |
| 6,657,542 | B2 * | 12/2003 | Usami | 340/572.8 |
| 7,683,786 | B2 * | 3/2010 | Kaoru | 340/572.1 |
| 2002/0175804 | A1 * | 11/2002 | Saito | 340/10.1 |
| 2004/0061613 | A1 * | 4/2004 | Usami | 340/572.8 |
| 2008/0004908 | A1 * | 1/2008 | Oh et al. | 705/2 |
| 2008/0094222 | A1 * | 4/2008 | Kaoru | 340/572.7 |
| 2012/0012655 | A1 * | 1/2012 | Kai et al. | 235/439 |
| 2012/0299703 | A1 * | 11/2012 | Chen | 340/10.1 |

* cited by examiner

*Primary Examiner* — Tuyen K Vo

(57) ABSTRACT

A radio frequency identification electronic device with enhancing surface wave-guide effect includes a host or a programmable single IC, an identification transmitting/receiving device electrically connected to the host or the programmable single IC for generating a current, and an enhancing surface wave-guide coaxial cable structure. The enhancing surface wave-guide coaxial cable structure comprises a coaxial cable having at least one breach region without an outer conducting layer and a matching resistor, wherein the current builds up an electromagnetic (EM) wave while flowing through the at least one breach region, and the EM wave is transmitted along the outer conducting layer of the coaxial cable until to the matching resistor. Moreover, an electromagnetic field can be built up while the current flows through the at least one breach region, and a RFID electronic tag attached to an object can be automatically triggered by the electromagnetic field.

4 Claims, 4 Drawing Sheets

RADIO FREQUENCY IDENTIFICATION ELECTRONIC DEVICE WITH ENHANCING SURFACE WAVE-GUIDE EFFECT

BACKGROUND OF THE INVENTION

1. Field of the Invention

The present invention relates to a radio frequency identification electronic device, more specifically to an enhancing surface wave-guide coaxial cable structure modified from a general coaxial cable.

2. The Prior Arts

Ultra high frequency detecting technology is a distant wireless communication technology; the system used to execute this technology consists of an electronic tag, a reader and an antenna. When the electronic tag enters an electromagnetic field region generated by antenna, the electronic tag can be triggered by a wireless signal, and then the electronic tag transmits back an identification signal to the reader through the antenna, and then the reader reads the inner memory information from the electronic tag after confirming the identification signal.

Nowadays, the antenna of the ultra high frequency detecting technology is broadly used in management of product logistics in hypermarkets, entrance guard service, books, documents, medicines, clothes, security of goods costly such as jewelry, and the finishing line of a dog race, a horse race or track and field sports . . . , etc. However, the general operation method is that a person takes a radio frequency identification reader to read the electronic tags attached to products one by one, such that the labor cost and time is restricted. In addition, the triggering range and distance is not enough, so that even through there are some automatic triggering methods, the cost is still too high to apply.

Therefore, a radio frequency identification electronic device which is costly cheaper and can trigger the electronic tag automatically is required.

SUMMARY OF THE INVENTION

A primary objective of the present invention is to provide a radio frequency identification electronic device with enhancing surface wave-guide effect. The device comprising a host or a programmable single IC, an identification transmitting/receiving device, and an enhancing surface wave-guide coaxial cable structure. The identification transmitting/receiving device is electrically wired or wireless connected to the host or the programmable single IC for generating a current. The enhancing surface wave-guide coaxial cable structure comprises a coaxial cable having at least one breach region without an outer conducting layer and a matching resistor connected to the inner conducting layer and the outer conducting layer of the coaxial cable, wherein the current builds up an electromagnetic (EM) wave while flowing through the at least one breach region, and the EM wave is transmitted along the outer conducting layer of the coaxial cable until to the matching resistor, such that the surface wave-guide effect can be enhanced.

In addition, the EM wave generated by the current leaks out of the coaxial cable, and builds up an electromagnetic field. Therefore, a radio frequency identification electronic tag attached to an object can be automatically triggered in an effective range, and then the radio frequency identification electronic tag transmits the information stored therein to the host or the programmable single IC through the identification transmitting/receiving device.

The technical features of the present invention are that using the enhancing surface wave-guide coaxial cable structure modified from a general coaxial cable. The EM wave is built up while the current flows through the breach region, and the EM wave is transmitted along the outer conducting layer of the coaxial cable and builds up an electromagnetic field, such that the surface wave-guide effect is enhancing and the RFID tag can be automatically triggered. Therefore, the cost is cheaper, the mounting of the device is much easier, and the labor cost is also reduced.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
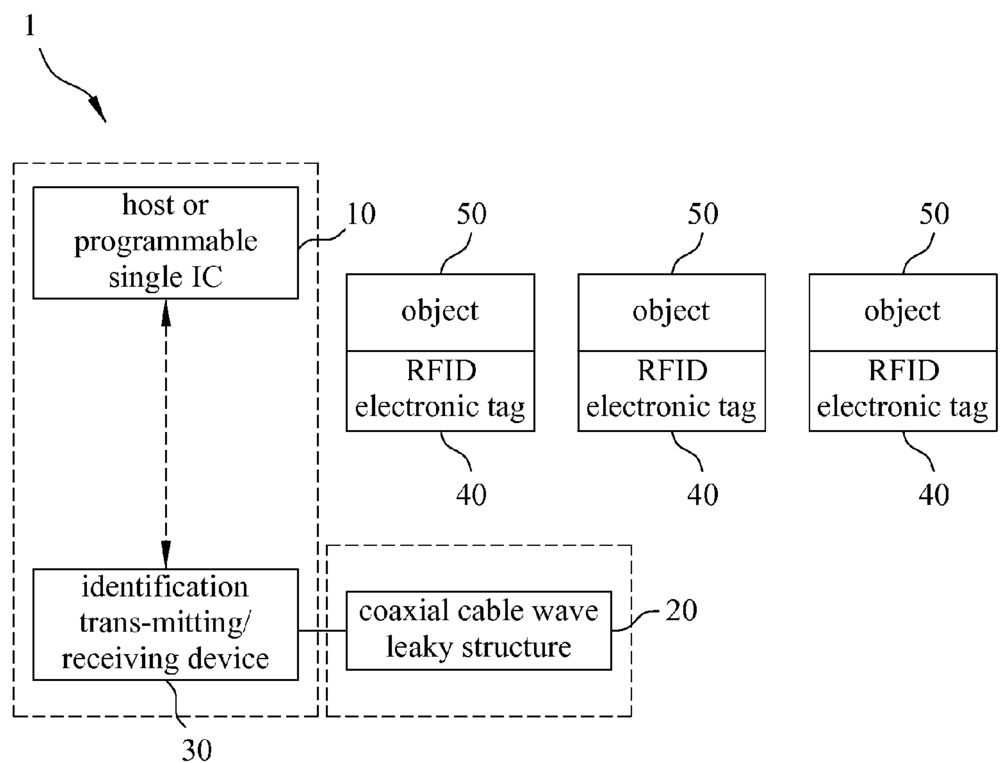
FIG. 1 is a unit conceptual diagram of the radio frequency identification electronic device with enhancing surface wave-guide effect of the present invention.

Please refer to FIG. 1, the unit conceptual diagram of the radio frequency identification electronic device with enhancing surface wave-guide effect of the present invention. As shown in FIG. 1, the radio frequency identification electronic device with enhancing surface wave-guide effect 1 of the present invention comprises a host or a programmable single IC 10, an enhancing surface wave-guide coaxial cable structure 20, and an identification transmitting/receiving device 30 electrically wired or wireless-connected to the host or the programmable single IC 10 for generating a current.

The enhancing surface wave-guide coaxial cable structure 20 is connected to the identification transmitting/receiving device 30, and comprises a coaxial cable having at least one breach region without an outer conducting layer of the coaxial cable and a matching resistor connected to an inner conducting layer and the outer conducting layer. The current generated by the identification transmitting/receiving device 30 and flowing to the inner conducting layer of the coaxial cable builds up an EM wave, and the EM wave is transmitted along the outer conducting layer of the coaxial cable until to the matching resistor, such that the surface wave-guide effect can be enhanced.

The EM wave leaks out effect in the at least one breach region and builds up an electromagnetic field, such that a radio frequency identification (RFID) electronic tag 40 attached to an objects 50 can be automatically triggered by the electromagnetic field within an effective range, and then the RFID electronic tag 40 transmits the information therein to the host or the programmable single IC 10.

Figure 2A:
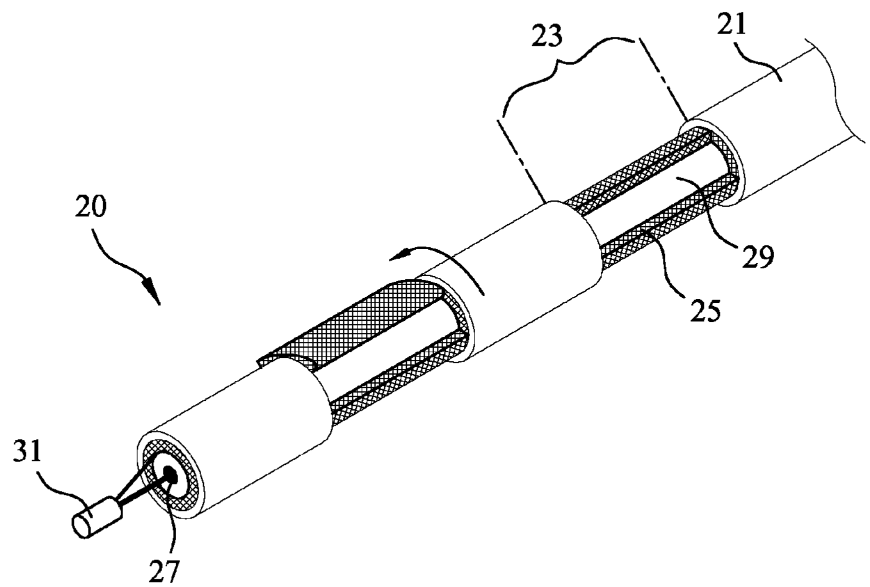
FIG. 2A is a detail unit conceptual diagram of the enhancing surface wave-guide coaxial cable structure in FIG. 1.

Please refer to the FIG. 2A, the detail unit conceptual diagram of the enhancing surface wave-guide coaxial cable structure in FIG. 1. The enhancing surface wave-guide coaxial cable structure 20 comprises a coaxial cable 21 having at least one breach region 23 without an outer conducting layer 25, and a matching resistor 31 connected to an inner conducting layer 27 and the outer conducting layer 25 of the coaxial cable 21, wherein the inner conducting layer 27 is covered by an insulating layer 29. In addition, the matching resistor 31 has a resistance value of 40~80Ω.

Figure 2B:
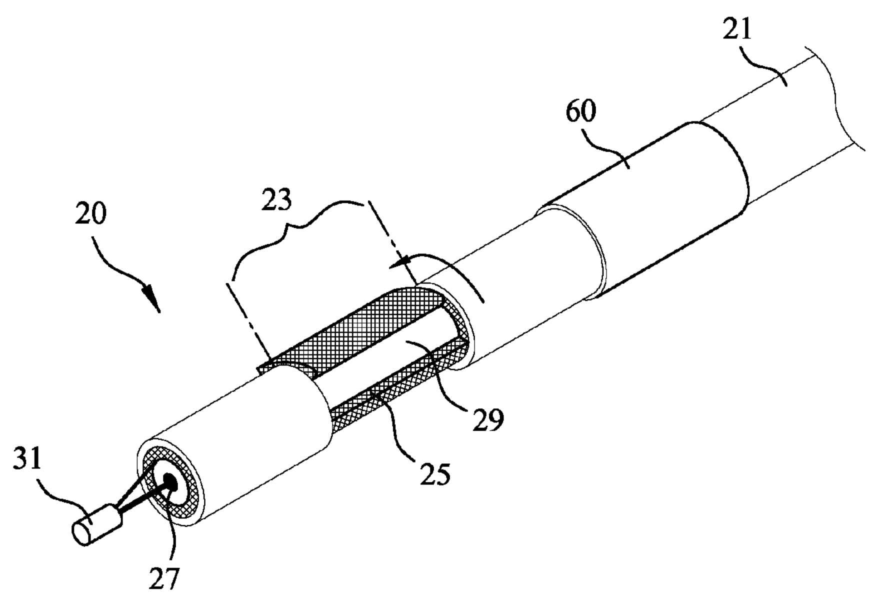
FIG. 2B is a detail unit conceptual diagram of another embodiment of the enhancing surface wave-guide coaxial cable structure in FIG. 1.

Please refer to the FIG. 2B, as shown in FIG. 2B, the at least one breach region 23 can be further covered by an insulating tape 60. Since the outer conducting layer 25 does not exist at least one breach region 23, and the current generated by the identification transmitting/receiving device 30 and flowing to the inner conducting layer 27 of the coaxial cable 21 builds up an EM wave, and the EM wave is transmitted along the outer conducting layer 25 of the coaxial cable the coaxial cable 21 until to the matching resistor 31, such that the surface wave-guide effect can be enhanced.

The EM wave leaks out and an electromagnetic is built up while the current generated by the identification transmitting/receiving device 30 flows through the at least one breach region 23, and the RFID electronic tag 40 attached to an object 50 can be automatically triggered within an effective range within a radius of 1 to 100 cm centered around the coaxial cable 21.

Figure 3A:
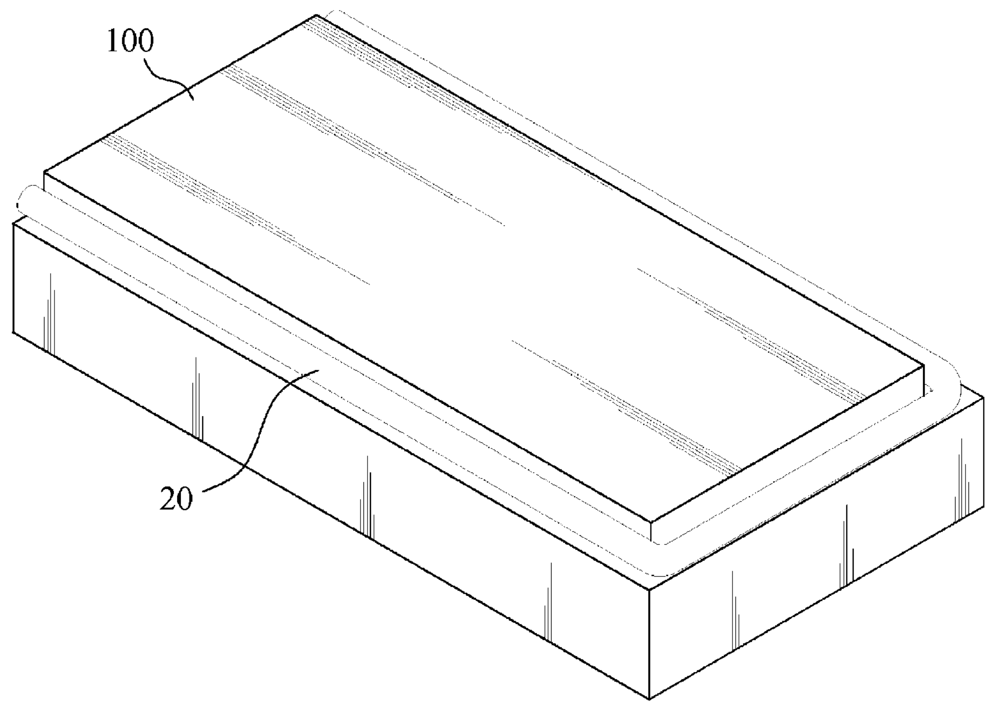
FIGS. 3A to 3B are the diagrams showing real application of the radio frequency identification electronic device with enhancing surface wave-guide effect of the present invention.
Figure 3B:
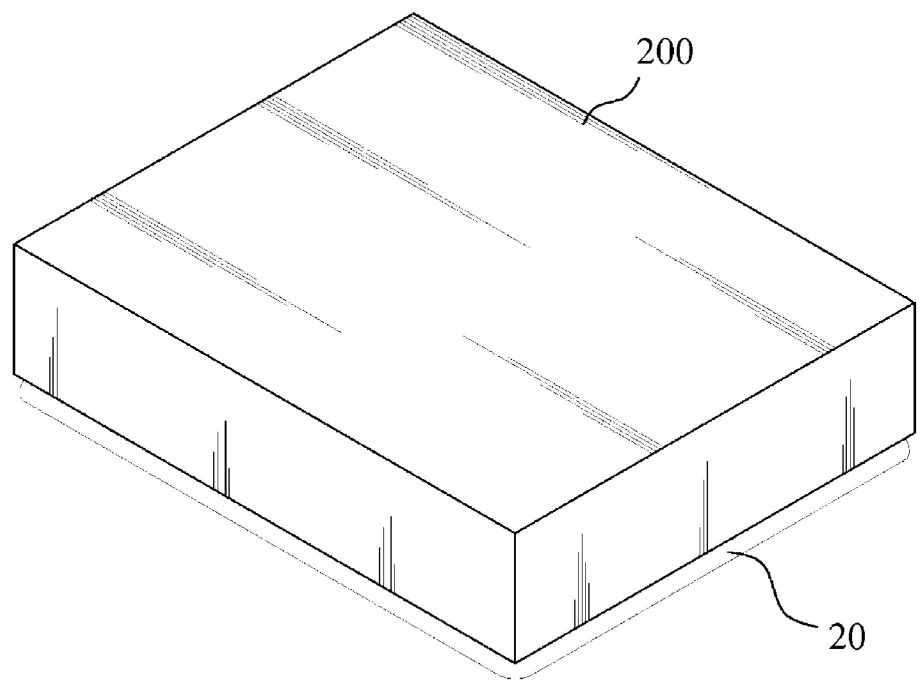

Please refer to FIGS. 3A and 3B, the diagrams showing real application of the radio frequency identification electronic device with enhancing surface wave-guide effect of the present invention. As shown in FIG. 3A, The enhancing surface wave-guide coaxial cable structure 20 is mounted on the circumference of a space 100, for example, mounted on the circumference of a box or a metal box, or mounted on the circumference of ceilings of a storehouse; therefore, when the objects 50 attached with the RFID electronic tag 40 are moved in or out the space 100, the RFID electronic tag 40 can be triggered by the electromagnetic field, and the RFID electronic tag 40 transmits the information stored therein to the host or the programmable single IC 10 through the identification transmitting/receiving device 30, and the radio frequency identification electronic device with enhancing surface wave-guide effect 1 can be used in management of the product logistics in hypermarkets, entrance guard service, books, documents, medicines, clothes, security of goods costly such as jewelry, and device or parts in a cabinet.

As shown in FIG. 3B, the enhancing surface wave-guide coaxial cable structure 20 would be mounted under the floor 200, such that objects 50 attached with the RFID electronic tag 40 can be triggered, and the radio frequency identification electronic device with enhancing surface wave-guide effect 1 can be used in the arenas for the track and field sports, the dog race, or the horse race, or the entrance of the department stores or storehouses.

The technical features of the present invention are that using the enhancing surface wave-guide coaxial cable structure modified from a general coaxial cable. The EM wave is built up while the current flows through the breach region, and the EM wave is transmitted along the outer conducting layer of the coaxial cable and builds up an electromagnetic field due to leaking in the breach region, such that the surface wave-guide effect is enhancing and the RFID tag can be automatically triggered. Therefore, the cost is cheaper, the mounting of the device is much easier, and the labor cost is also reduced.

Although the present invention has been described with reference to the preferred embodiments thereof, it is apparent to those skilled in the art that a variety of modifications and changes may be made without departing from the range of the present invention which is intended to be defined by the appended claims.

What is claimed is:

1. A radio frequency identification electronic device with enhancing surface wave-guide effect, comprising:

a host or a programmable single IC;

an identification transmitting and receiving device electrically wired or wireless connected to the host or the programmable single IC for generating a current; and an enhancing surface wave-guide coaxial cable structure connected to the identification transmitting and receiving device, and comprising a coaxial cable having at least one breach region without an outer conducting layer and a matching resistor connected to an inner conducting layer and the outer conducting layer of the coaxial cable, wherein the current flowing to the inner conducting layer of the coaxial cable builds up an electromagnetic wave, and the electromagnetic wave leaks out in the at least one breach region and the electromagnetic wave is transmitted along the outer conducting layer of the coaxial cable until to the matching resistor, such that a radio frequency identification electronic tag attached to an object is automatically triggered by an electromagnetic field within an effective range, and the radio frequency identification electronic tag transmits information stored therein to the host or the programmable single IC through the identification transmitting and receiving device.

2. The radio frequency identification electronic device with enhancing surface wave-guide effect according to claim 1, wherein the at least one breach region is covered by an insulating tape.

3. The radio frequency identification electronic device with enhancing surface wave-guide effect according to claim 1, wherein the effective range is within a radius of 1 to 100 cm centered around the coaxial cable.

4. The radio frequency identification electronic device with enhancing surface wave-guide effect according to claim 1, wherein the matching resistor has a resistance value of 40~80Ω.

* * * * *